(12) United States Patent
Fling et al.

(10) Patent No.: US 7,444,865 B2
(45) Date of Patent: Nov. 4, 2008

(54) PARALLELOGRAM ACTUATED LIQUID LEVEL SENSOR

(76) Inventors: John J. Fling, 48501 E. Buckhorn Cove Rd., Little River, CA (US) 95456; William F. Fling, 48501 E. Buckhorn Cove Rd., Little River, CA (US) 95456

( * ) Notice: Subject to any disclaimer, the term of this patent is extended or adjusted under 35 U.S.C. 154(b) by 0 days.

(21) Appl. No.: 11/800,443

(22) Filed: May 4, 2007

(65) Prior Publication Data

US 2007/0283756 A1 Dec. 13, 2007

Related U.S. Application Data

(60) Provisional application No. 60/798,175, filed on May 4, 2006.

(51) Int. Cl.
G01F 23/30 (2006.01)
G01F 23/32 (2006.01)
(52) U.S. Cl. .......................... 73/315; 73/317
(58) Field of Classification Search .................. 73/305, 73/309, 315, 317
See application file for complete search history.

(56) References Cited

U.S. PATENT DOCUMENTS

| | | | |
|---|---|---|---|
| 884,370 A | 4/1908 | Dobson | |
| 1,495,292 A | 5/1924 | Echtler | |
| 2,006,616 A * | 7/1935 | Adams | 215/366 |
| 2,069,793 A * | 2/1937 | Watson | 73/315 |
| 2,102,615 A | 12/1937 | Cubete | |
| 2,592,929 A | 4/1952 | Matchett | |
| 2,685,797 A | 8/1954 | Morschel | |
| 2,771,774 A | 11/1956 | Fornasieri | |
| 3,115,782 A | 12/1963 | Lenker | |
| 3,314,292 A | 4/1967 | Schulte et al. | |
| 3,555,904 A | 1/1971 | Lenker | |
| 3,793,884 A * | 2/1974 | Fling et al. | 73/315 |
| 4,064,754 A | 12/1977 | Frey | |
| 4,134,022 A | 1/1979 | Jacobsen | |
| 4,275,295 A | 6/1981 | Menningen et al. | |
| 4,560,868 A | 12/1985 | Brogardh et al. | |
| 4,692,023 A | 9/1987 | Ohtomo et al. | |
| 4,745,293 A | 5/1988 | Christensen | |
| 4,796,472 A | 1/1989 | Lew | |
| 4,802,363 A | 2/1989 | Fling et al. | |
| 4,833,919 A | 5/1989 | Saito et al. | |
| 4,870,861 A * | 10/1989 | Ohtani et al. | 73/317 |
| 4,928,526 A * | 5/1990 | Weaver | 73/313 |
| 5,001,338 A | 3/1991 | Boero | |

(Continued)

*Primary Examiner*—Thomas N Moulis
(74) *Attorney, Agent, or Firm*—Lynn & Lynn

(57) ABSTRACT

A liquid level sensor for insertion into a tank for measuring the liquid level in the tank comprises an elongate tubular frame and a float movable inside the frame to seek the liquid level. A float lock guide formed as an elongate member is mounted lengthwise inside the frame. A float lock formed as an elongate member is located inside the frame parallel to the float lock guide. A plurality of linkages is pivotally connected between the float lock guide and the float lock such that lengthwise movement of the float relative to the float lock guide causes corresponding lateral movement of the float in the frame between an unlocked position where the float is free to move lengthwise in the frame to seek the liquid level and a locked position where frictional forces retain the float between the float lock and an inner wall portion of the frame.

3 Claims, 3 Drawing Sheets

U.S. PATENT DOCUMENTS

| | | | | |
|---|---|---|---|---|
| 5,031,655 A | * | 7/1991 | Hebaus | 137/202 |
| 5,056,364 A | * | 10/1991 | Kahler et al. | 73/296 |
| 5,174,345 A | * | 12/1992 | Kesterman et al. | 141/198 |
| 5,655,565 A | * | 8/1997 | Phillips et al. | 137/413 |
| 6,167,756 B1 | * | 1/2001 | Everson et al. | 73/314 |
| 2004/0182151 A1 | * | 9/2004 | Meure | 73/313 |
| 2007/0181585 A1 | * | 8/2007 | Lane | 220/592.16 |

* cited by examiner

PARALLELOGRAM ACTUATED LIQUID LEVEL SENSOR

Priority is claimed based on U.S. provisional application 60/798,175, filed May 4, 2006.

BACKGROUND OF THE INVENTION

This invention relates generally to measuring liquid levels in containers that may either underground or on the surface.

U.S. Pat. No. 2,069,793 (Watson) discloses a liquid level sensing device that employs a sequence of angled slots distributed along its length to control the movement of a float locking surface that secures the float, which rests on the liquid-air interface in position against a scale. This disadvantage of this approach is that frictional forces between the slot surfaces and the moving element in the slot limit the uniformity of movement of the locking surface, which results in ambiguous liquid level readings. In addition, the cumulative effect of the frictional forces requires that considerable force be applied to the float locking/unlocking mechanism.

U.S. Pat. No. 7,043,984, which issued to the present inventors on May 16, 2006, attempts to compensate for the variable friction forces in the slot mechanisms by providing a sequence of springs along the length of a frame. The springs apply forces to a float locking member that assures closer tolerance control of the spacing between the float locking surface and the interior wall of the frame of the liquid level sensing device.

SUMMARY OF THE INVENTION

The present invention eliminates the use of inclined slots as the actuating mechanism and substitutes a simple parallelogram linkage with an associated spring that minimizes friction and assures precise control of the float locking member spacing at all points along its entire length in both the locked and unlocked positions. The precise control permits a relatively small clearance to be maintained between the float surfaces and both the float locking mechanism surface and the interior surface of the device.

The need for such close tolerance control over the float locking member is that the sensing device must be inserted into a tubing with an inside diameter of 1.5 in. This results in an inside dimension for the sensing device of less than one inch. In addition, the length of the float locking member is a minimum of 144 in., and the maximum spacing permitted between the sensing float and the member is 0.1 in. to allow the float to seek the liquid level. Any undulations in the surface of the float locking member exceeding 0.03 in. will potentially result in an erroneous level reading due to accumulated tolerance buildup in the float and the interior of the sensing device.

A liquid level sensor according to the present invention for insertion into a tank for measuring the liquid level in the tank comprises a frame formed as an elongate tubular member and a float movable inside the frame to seek the liquid level in the tank. A float lock guide formed as an elongate member is mounted lengthwise inside the frame. A float lock formed as an elongate member is located inside the frame parallel to the float lock guide. A plurality of linkages is pivotally connected between the float lock guide and the float lock such that lengthwise movement of the float relative to the float lock guide causes corresponding lateral movement of the float in the frame between an unlocked position in which the float is free to move lengthwise in the frame to seek the liquid level and a locked position in which the float is retained by frictional forces between the float lock and an inner wall portion of the frame.

Each linkage preferably includes a spring that produces force that biases the float lock toward the locked position.

The float lock preferably includes a foot piece arranged such that application of a lengthwise force thereto moves the float lock to the unlocked position. The lengthwise force may be just the weight of the liquid level sensor or it may include a manually applied force to push the foot piece against the tank bottom.

DETAILED DESCRIPTION OF THE INVENTION

Figure 1:
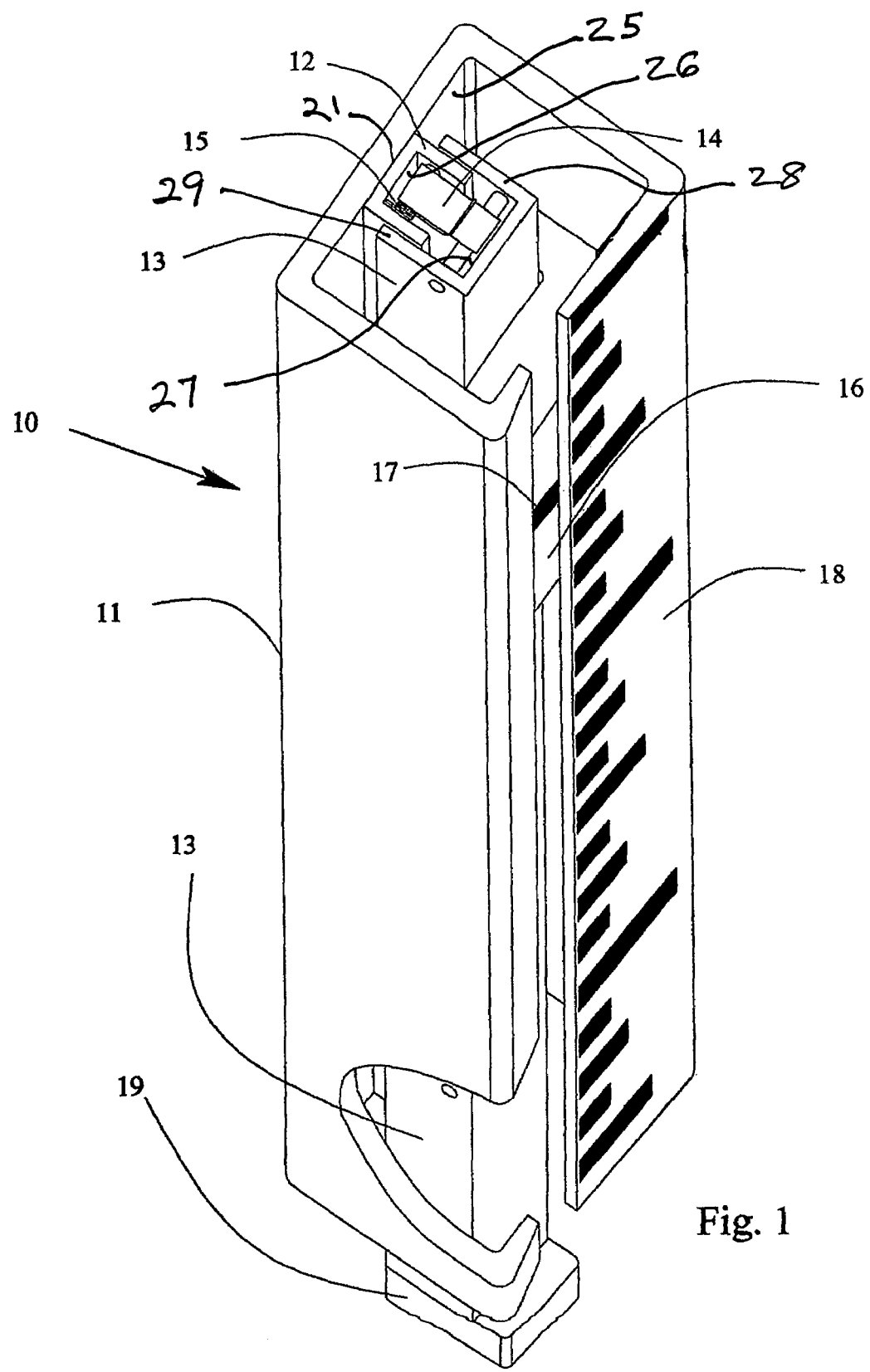
FIG. 1 is a perspective view showing the overall configuration of a liquid level sensor according to the present invention.

Referring to FIG. 1, a liquid level sensor 10 according to the present invention includes a frame 11 that may be formed by extruding a suitable plastic material. The cross section of the frame 11 may be visualized as a rectangle having a lengthwise opening 17 in one side. The frame 1 typically has a length of fourteen to seventeen feet to be suitable for measuring liquid levels in underground fuel tanks. The frame 1 is not limited to the cross section shown in the drawings. The invention may be readily practiced using a frame having other cross sectional shapes such as circular, triangular or hexagonal, for example, depending on applications and user preferences.

Figure 3A:
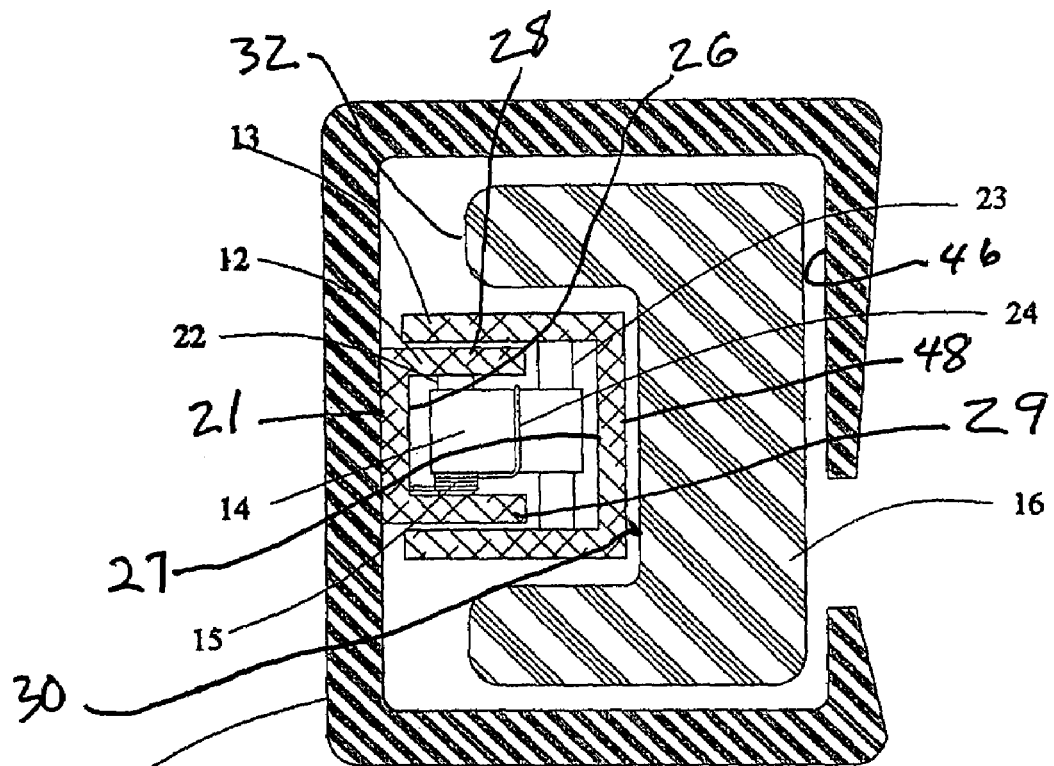
FIG. 3A is a top plan view of the liquid level sensor according to the present invention showing the float locking surface in the float unlocked position.
Figure 3B:
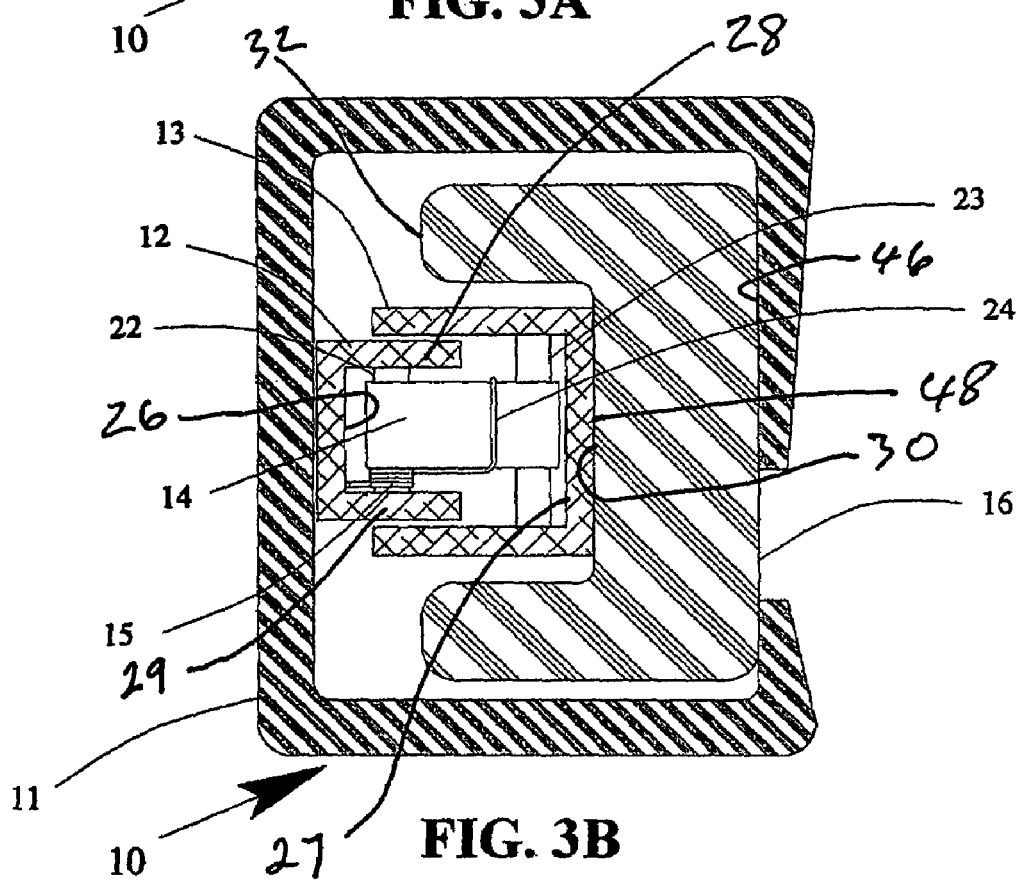
FIG. 3B is a top plan view of the liquid level sensor according to the present invention showing the float locking surface in the float locked position.

As shown in FIGS. 1, 3A and 3B, a float 16 is mounted inside the frame 11. The float 16 may be formed either as a hollow or solid block having generally rectangular surfaces. The float 16 has a channel 30 formed in a side 32. The channel 30 preferably has a generally U-shaped cross section and preferably extends the entire length of the float 16.

The frame 11 encloses a float 16 and a float locking mechanism 20. When the liquid level sensor 10 is initially inserted into a tank containing a liquid, the float 16 is free to translate within the frame 11 to seek the liquid/air interface. The buoyancy of the float 16 may be adjusted by controlling its specific gravity if it is solid, or by using weights if it is hollow, so that the float 16 floats such that the liquid/air interface is indicated at a liquid level mark 17 on a scale 18 on a surface portion of the frame 11 as shown in FIG. 1.

Referring to FIGS. 1, 2A, 2B, 3A and 3B, the float locking mechanism 20 includes a float lock guide 12 and a float lock 13 mounted inside the frame 11. The float lock guide 12 is preferably an elongate member formed to have a generally rectangular cross section as best shown in FIGS. 3A and 3B. A side 21 of the float lock guide 12 is connected to an inner wall portion 25 of the frame 12. The float lock guide 12 is open at the side opposite the side 21 to form a channel 26 that faces inwardly in the frame 12. The float lock 13 preferably has the same general configuration as the float lock guide 12. The float lock 13 preferably includes a channel 27 having a width sufficient for side portions 28 and 29 to extend into the channel 27.

Figures 2A, 2B:
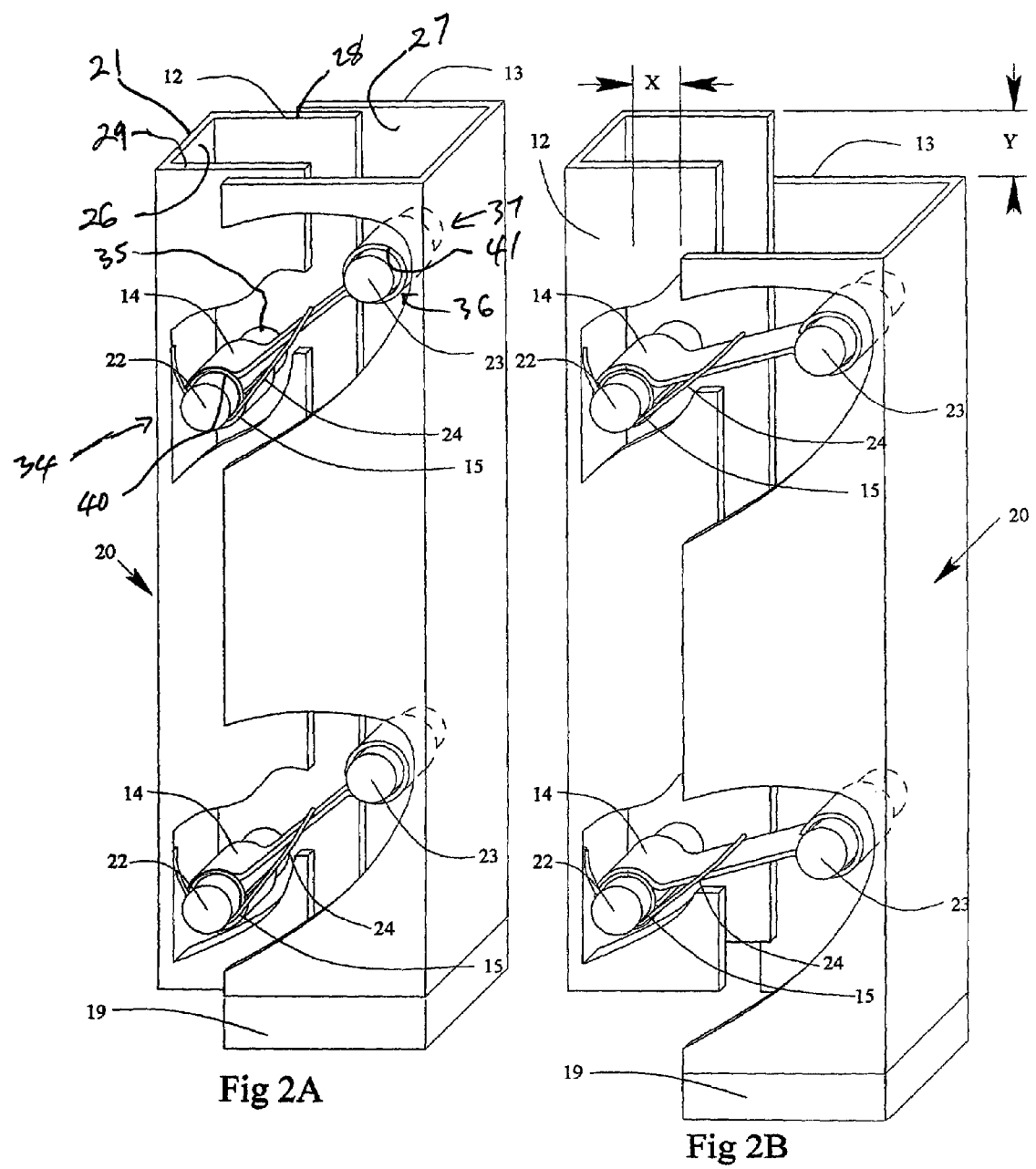
FIG. 2A is a perspective view of the liquid level sensor of FIG. 1 showing a float locking surface in a float unlocked position.
FIG. 2B is a perspective view of the liquid level sensor of FIG. 1 showing the float locking surface in a float locked position.

The float lock guide 12 and the float lock 13 are linked together at a plurality of locations. In FIGS. 1, 2A and 2B portions of the frame 11 are cut away to show the linkages 14. A pin 22 is mounted in passages 34 and 35 of the float lock guide 12, and a similar pin 23 is mounted in passages 36 and 37 of the float lock 13. The linkage 14 has generally cylindrical passages 40 and 41 at opposite ends thereof. The pins 22 and 23 extend through the passage 40 and 41, respectively, to pivotally connect the linkage 14 between the float lock guide 12 and the float lock 13. A spring 15 is mounted on the pin 22 and has an extended arm 24 that extends over the linkage 14 to bias it toward the bottom end of the frame 11. A plurality of linkages 14 are mounted between the float lock guide 12 and the float lock 13 spaced apart periodically. These linkages 14 form a sequence of parallelograms that assure that for any given movement of the float lock 13 lengthwise in the frame 11, there is a specific corresponding lateral movement of the float lock 13.

Frictional force in the locking mechanism 20 can be very small since components thereof can be fabricated of material such as Nylon or Teflon to provide long-term lubrication.

The float 16 includes a recess 44 having a generally U-shaped cross section. When the locking mechanism 20 is in the unlocked configuration as shown in FIG. 3A, the float 16 is free to move lengthwise in the frame 11 between an inner wall portion 46 of the frame 11 and outer surface 48 of the float lock 13. The spacing between the surface 48 of the float lock 13 and the inner wall 46 of the frame 11 is such that in the absence of any other force, the spring 15 presses the float lock 13 against the inner wall 46 of the frame 11 with a force sufficient to lock the float 16 in a position to indicate the liquid level.

When the liquid level sensor 10 is inserted into a tank (not shown) until a foot piece 19 of the float lock 13 is made to contact the tank bottom, the float lock 13 moves a vertical distance Y and a horizontal distance X to displace the float laterally from the inner wall 48 of the frame (FIGS. 2A and 3A). This is the unlocked position of the float lock 13 shown in FIG. 3A that permits the float 16 to be free to seek the liquid level in the tank.

Withdrawing the foot piece 19 from contact with the tank bottom removes the upward force on the float lock so that the spring 15 pushes the float lock 13 against the float 16 to lock it between the float lock 13 and the inner wall 48 of the frame 11. The frame 11 is withdrawn from the tank so that the location of the liquid level mark relative to the scale may be seen so that the liquid level is measured.

Although the present invention described in connection with a preferred embodiment it is to be understood that modifications within the scope of the invention may occur to those skilled in the appertaining art.

What is claimed is:

1. A liquid level sensor for insertion into a tank for measuring the liquid level in the tank, comprising:
   a frame formed as an elongate tubular member;
   a float located inside the frame and having a liquid level mark thereon to indicate the liquid level;
   a float lock guide formed as an elongate member mounted lengthwise inside the frame and having a first channel facing inward in the frame;
   a float lock formed as an elongate member located inside the frame, the float lock; and
   a plurality of linkages pivotally connected between the float lock guide and the float lock such that lengthwise movement of the float relative to the float lock guide causes corresponding lateral movement of the float in the frame between an unlocked position in which the float is free to move lengthwise in the frame to seek the liquid level and a locked position in which the float is retained by frictional forces between the float lock and an inner wall portion of the frame.

2. The liquid level sensor of claim 1 wherein each linkage includes a spring that produces force that biases the float lock toward the locked position.

3. The liquid level sensor of claim 2 wherein the float lock includes a foot piece arranged such that application of a lengthwise force thereto moves the float lock to the unlocked position.

* * * * *